United States Patent [19]

Farina

[11] Patent Number: 6,098,656
[45] Date of Patent: Aug. 8, 2000

[54] CHECK VALVE

[76] Inventor: Alfred J. Farina, 1939 Anita Ct., Baldwin, N.Y. 11510

[21] Appl. No.: 09/440,077

[22] Filed: Nov. 15, 1999

[51] Int. Cl.[7] .................................................. F16K 15/00
[52] U.S. Cl. ........................................ 137/512.1; 137/527
[58] Field of Search ........................... 137/512.1, 512.15, 137/527

[56] References Cited

U.S. PATENT DOCUMENTS

| | | | |
|---|---|---|---|
| 1,087,981 | 2/1914 | Reynolds | 137/512.1 |
| 2,292,003 | 8/1942 | Yant et al. | 137/512.15 |
| 2,800,920 | 7/1957 | Smith | 137/512.15 |
| 2,898,080 | 8/1959 | Smith | 137/512.15 |
| 3,047,012 | 7/1962 | Smith | 137/512.15 |
| 4,195,657 | 4/1980 | Pysh | 137/512.15 |

*Primary Examiner*—Gregory L. Huson
*Assistant Examiner*—Joanne Y. Kim
*Attorney, Agent, or Firm*—Myron Amer PC

[57] ABSTRACT

For a pipe check valve of a known construction involving a peripheral extending rubber seal and known to be installed by being manually urged through ascending movement in the pipe, the newly added recess below the peripheral seal to receive thereinto a fold-down of the seal during the ascending movement to obviate abrasion of the seal as might contribute to leakage of the check valve during use.

1 Claim, 1 Drawing Sheet

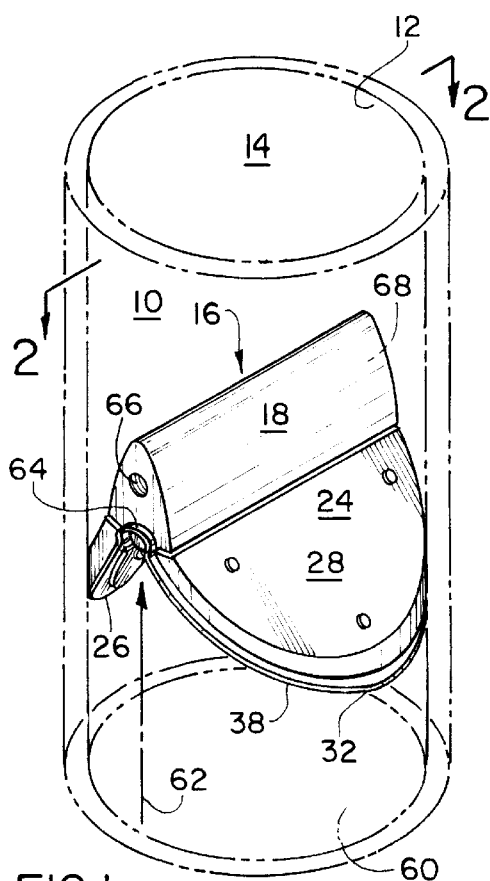
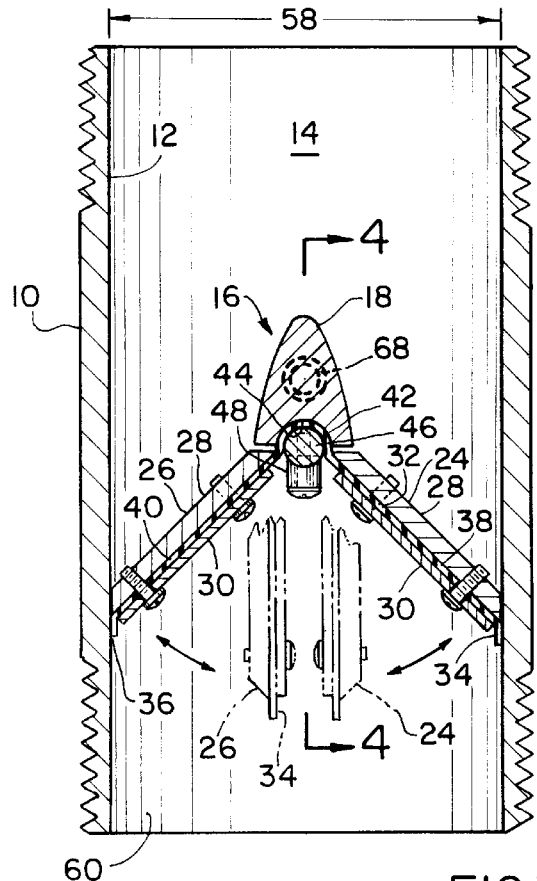
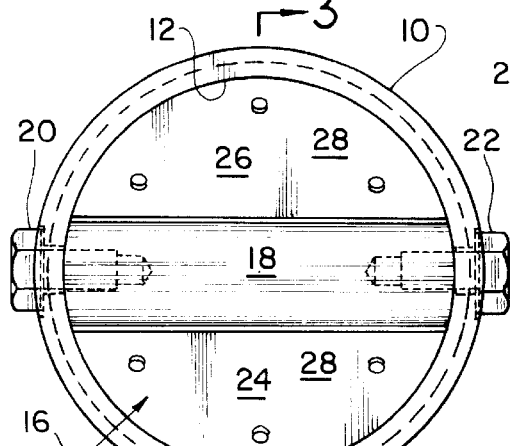
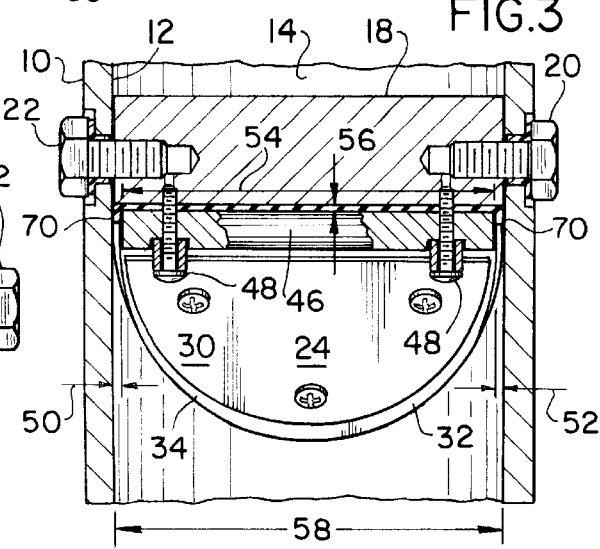
FIG.1    FIG.3
FIG.2    FIG.4

CHECK VALUE

The present invention relates generally to improvements for a check valve, the improvements more particularly obviating leakage past an installed said check valve when it is in a flow passage blocking condition and is required to provide complete shut-off of the flowing fluid.

EXAMPLE OF THE PRIOR ART

Prior patents describing and illustrating check valves constitute a crowded art. One such exemplary prior patent from this art is U.S. Pat. No. 2,800,920 for "Check Valve" issued to E. M. Smith on Jul. 30, 1957. In the '920 and all other known patents, the construction of the check valve is readily understood, but nevertheless on numerous occasions, there is leakage past the installed check valve when it is supposed to provide complete shut-off of the flowing fluid.

The cause of the leakage, it is believed, has not been properly diagnosed by those well versed in this art, and thus remains as a serious unsolved problem.

Broadly, it is an object of the present invention to provide a problem-free check valve overcoming the foregoing and other shortcomings of the prior art.

More particularly, it is an object to structurally constitute the check valve to take into account the manner in which it is installed in a flow passage and, with said constituted structure obviate leakage past the shut-off check valve condition, all as will be better understood as the description proceeds.

The description of the invention which follows, together with the accompanying drawings should not be construed as limiting the invention to the example shown and described, because those skilled in the art to which this invention appertains will be able to devise other forms thereof within the ambit of the appended claims.

FIG. 1 is a perspective view of an installed check valve illustrated in full line perspective in an assumed flow-restricting condition within the flow passage of a pipe which is illustrated in phantom line perspective;

FIG. 2 is a plan view taken in the direction of the arrows and along line 2—2 of FIG. 1;

FIG. 3 is a cross sectional view taken along line 3—3 of FIG. 2; and

FIG. 4 is another cross sectional view taken along line 4—4 of FIG. 3.

To permit fluid flow through, and also to effectuate shut-off thereof, in relation to a hollow pipe 10 having an inner circular surface 12 bounding the flow passage 14, use is commonly made of a check valve, generally designated 16 which, as is generally known, is constructed with a cavitation-minimizing aerodynamically shaped nose or body 18 oriented in a diametrical relation, as best shown in FIG. 2, in the noted flow passage and connected by screws 20 and 22 at installation sites coinciding with the screws 20 and 22, which sites are to be understood to be also designated 20 and 22. Constructionwise, check valve 16 is completed with two identical semi-circular valve members 24 and 26 which are mounted in depending relation from the body 18, each valve member 24, 26 having an outer and inner plate 28 and 30 between which there is disposed in an interposed position a shape-matching seal 32 of rubber or like elastomeric construction material so as to better serve a fluid-sealing function, the dimension size of the seal 32 being slightly in excess of that of the valve members 24, 26 so that an elliptically shaped edge of the seal 32, as at 34, extends beyond the periphery of the valve members 24, 26 which provides a fluid tight seal, as at 36 when the valve members 24, 26 are urged from their adjacent positions as illustrated in phantom perspective as best shown in FIG. 3, into their spread-apart positions following pivotal traverses in response to pressure exerted against the valve members 24, 26 by fluid flowing in an ascending direction in the flow passage 14.

Seal 32, in between the shapes 38, 40 matching that of the valve members 24, 26, has an additional or third shape 42 of an inverted U-configuration which bounds a mounting pin-receiving compartment 44, said third seal shape 42 being looped over a mounting pin 46 so as to be in an interposed position in the compartment 44 when the mounting pin 46, centered in the compartment 44, is attached by screws, individually and collectively designated 48 to the body 18.

As essential aspect of the check valve 16 which underlies the present invention is the provision of a recess 50 and 52 at each opposite end of the mounting pin 46. This is achieved by selecting a lengthwise dimension 54 of the pin 46 which is approximately just less than twice the thickness 56 of the seal 32 relative to the body lengthwise dimension 58 so that in the centered position of the mounting pin 46 each end thereof is correspondingly approximately a single thickness 56 short of the body's lengthwise dimension. Also underlying the present invention is the recognition that the installing of the check valve 16 in the flow passage 14 requires manually urging the check valve 16 through a pipe access opening 60 in movement in the direction of flow, in this case an ascending movement, and thus along a path of movement 62 which results in flow passage contact of the pipe inner surface 12, with any lateral seal extension 64 from the mounting pin-receiving compartment 44 until the installment sites 20 and 22 are reached and alignment achieved between the screws 20, 22 and threaded drilled openings 66, 68. During the installation as noted, the contact along the movement path 62 is effective to fold any seal extension 64 into a cooperating recess 50, 52.

Failing to provide the recesses 50 and 52, which is the current prior art practice, invariably results in abrading contact between surface 12 and the seal extension 64 and, in turn, is believed to result in leakage past the installed check valve in its shut-off condition of FIGS. 1–4. With the provision of the recesses 50 and 52 it has been found in practice that the leakage problem is obviated. Currently, for a small diameter check valve 16, a seal thickness 56 of 0.025" is typically used, and for a large diameter check valve 16 a seal thickness of 0.063" is used, and the recesses 50 and 52 with these corresponding depths render the flow passage 14 fluid tight in the FIGS. 1–3 condition of the check valve 16.

While the apparatus for practicing the within inventive method, as well as said method herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

What is claimed is:

1. A check valve having an operative installed position within a hollow pipe having an inside surface bounding a circular flow passage of a selected diameter, said check valve comprising a body adapted to be disposed in a diametrical relation in said flow passage and of a lengthwise dimension approximately equal to said flow passage diameter, two valve members of semi-circular like shapes attached in depending relation from said body and pivotally traversible in movements between open flow-permitting and closed flow-restricting positions in said flow passage, a shaped seal of a selected thickness and of rubber construction material defined by first and second semicircular like shapes in a size slightly in excess of said two valve members so as to provide a peripheral edge in an elliptical configuration in said seal extending slightly beyond a periphery of said valve members, a third inverted U-shape in connecting relation between said first and second semi-circular like shapes and bounding a mounting pin-receiving compartment, a mounting pin with said seal in looped relation thereover centered in said mounting pin-receiving compartment attached to said body, said mounting pin having a lengthwise dimension selected to be of a lesser extent approximately equal to twice the selected thickness of said seal so that at opposite ends of said mounting pin said size difference thereof in relation to said lengthwise dimension of said body defines an end recess of an extent slightly in excess of said thickness of said seal, and an operative installed position of said check valve established at an installation site within said flow passage after manual movement thereto from an opening into said flow passage and in the direction of flow to said installation site, and a spaced apart opposite length portion of said shaped seal each in an inverted U-shape extending laterally of opposite ends of said third inverted U-shape and each in encircling relation about each said opposite end recess located at said opposite ends of said mounting pin and operative positions of said opposite length portions of said shaped seal folded into a cooperating said end recess to contribute to minimizing abrading contact thereof with said flow passage-bounding inner surface of said pipe as might result in leakage past said closed check valve during use.

\* \* \* \* \*